United States Patent [19]

Kawana et al.

[11] Patent Number: 4,794,236
[45] Date of Patent: Dec. 27, 1988

[54] IC CARD SYSTEM

[75] Inventors: Shigeyuki Kawana, Tokyo; Yoshimi Shigenaga, Higashiyamato, both of Japan

[73] Assignee: Casio Computer Co., Ltd., Tokyo, Japan

[21] Appl. No.: 923,329

[22] Filed: Oct. 23, 1986

[30] Foreign Application Priority Data

Oct. 29, 1985 [JP] Japan .............................. 60-242237
Oct. 29, 1985 [JP] Japan .............................. 60-242238

[51] Int. Cl.⁴ .............................................. G06K 7/06
[52] U.S. Cl. ................................... 235/441; 235/436; 235/492
[58] Field of Search ...................... 235/436, 441, 492

[56] References Cited

U.S. PATENT DOCUMENTS 3,971,916  7/1976  Moreno .
4,001,550  1/1977  Schatz ............................. 235/492 X
4,105,156  8/1978  Dethloff .
4,575,621  3/1986  Dreifus ........................... 235/492 X
4,675,516  6/1987  Guion ................................ 235/441

Primary Examiner—David L. Trafton
Attorney, Agent, or Firm—Frishauf, Holtz, Goodman & Woodward

[57] ABSTRACT

An IC card system according to this invention adopts a so-called intelligent-type IC card which has an internal power source of its own, can store designation data using the power source, and can display the storage content on a display unit. When the IC card is inserted in a terminal, the presence/absence of designation data is judged from the ON/OFF state of the power source of the card and, thereafter, a predetermined processing operation corresponding to the designation data is executed.

6 Claims, 8 Drawing Sheets

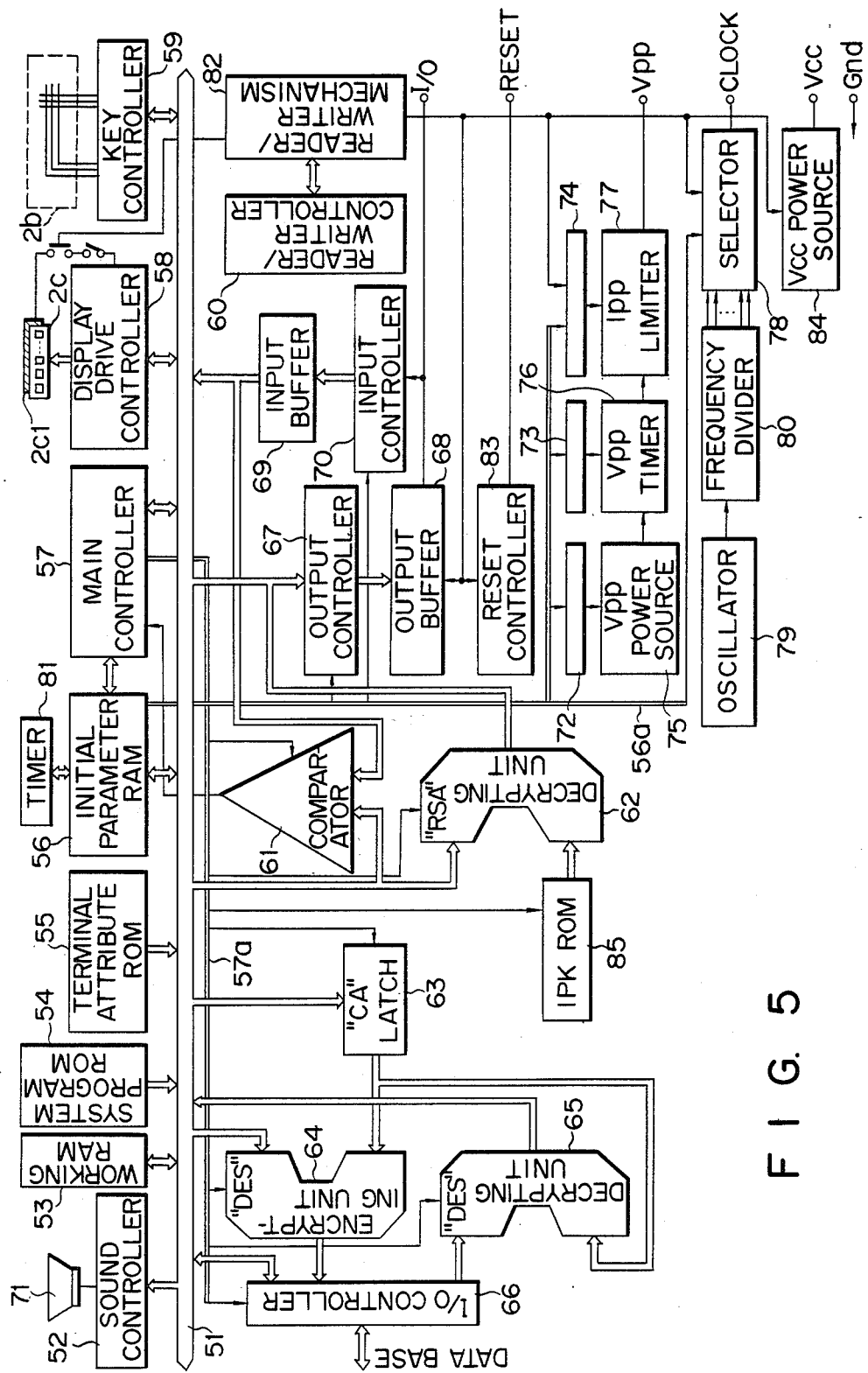
F I G. 5

F I G. 6
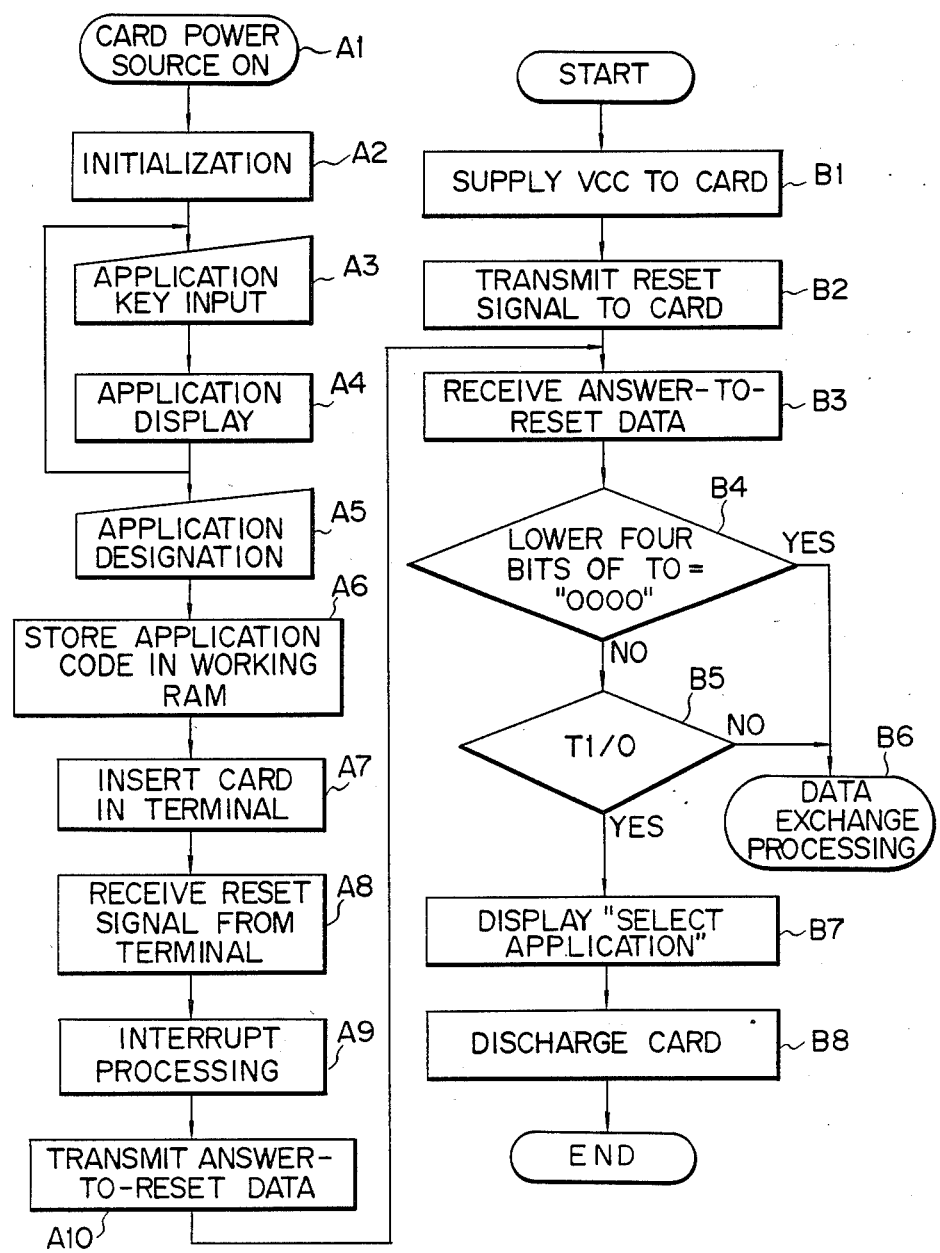

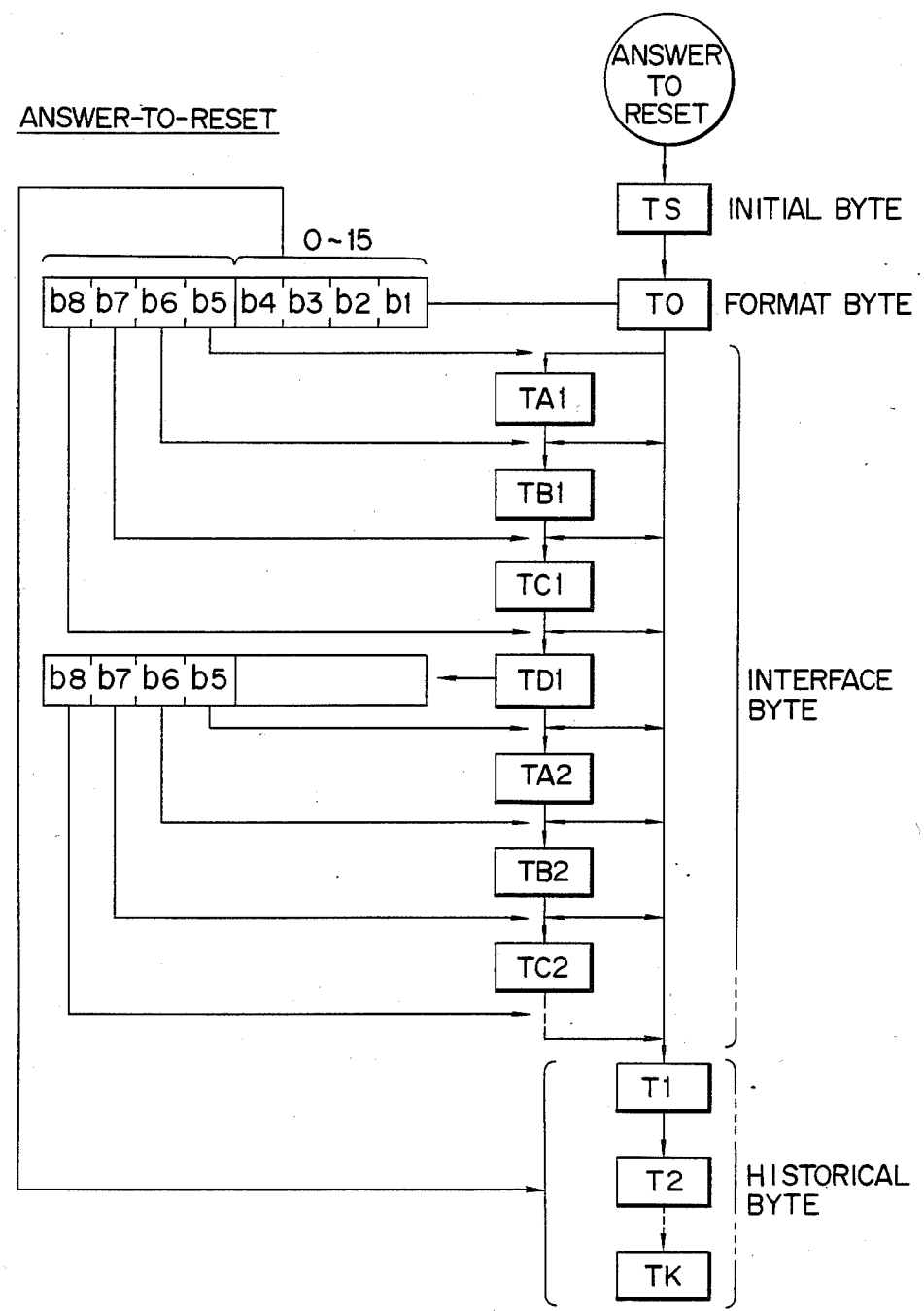

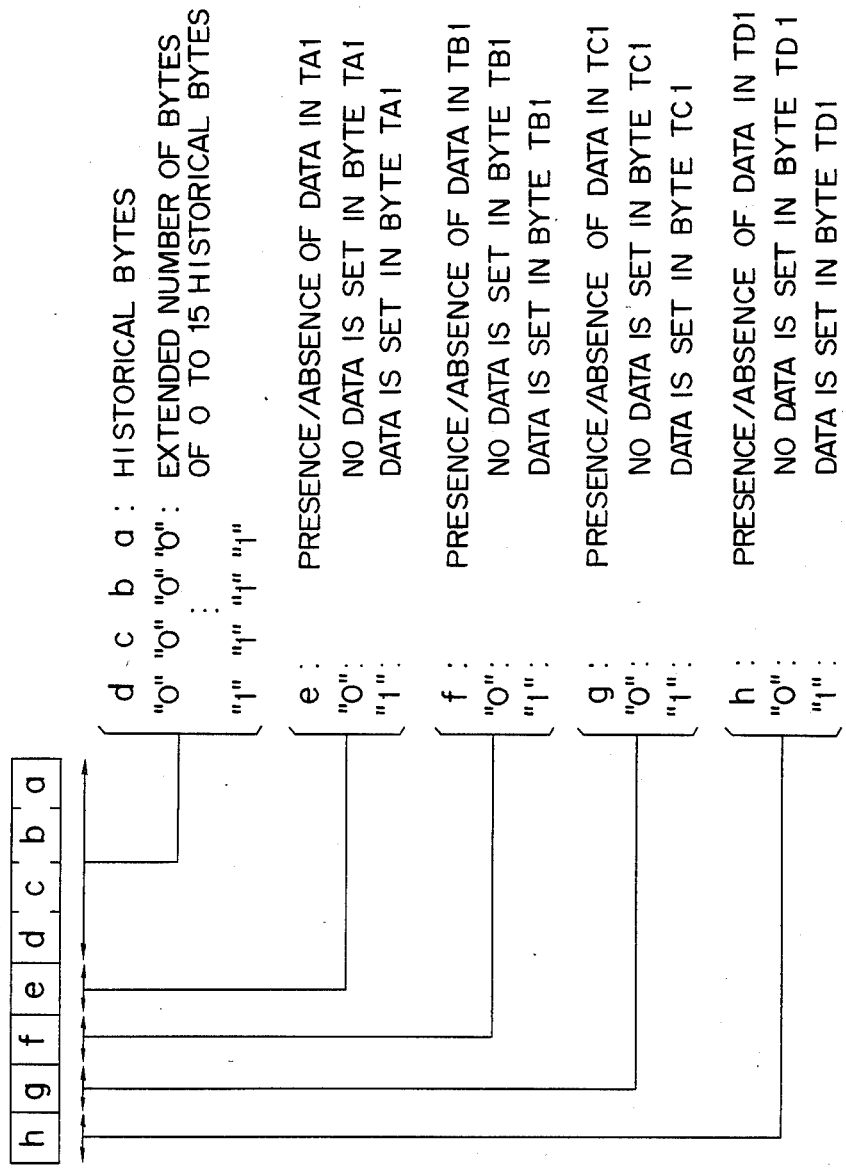

IC CARD SYSTEM

BACKGROUND OF THE INVENTION

The present invention relates to an IC card system adopting a so-called intelligent-type IC card which is capable of setting applications by itself.

In recent years of a so-called "cashless age" when cards issued by a credit card company are used, commodities can be purchased without cash.

Conventional cards include a plastic card, an embossed card, a magnetic stripe card, and the like. These cards can be easily counterfeited, thus posing a potential problem of illegal use.

In order to solve the above problem, an information card, i.e., a so-called IC card, incorporating an IC circuit storing an identification number which cannot be easily read out externally has been proposed. An IC card system combining the IC card and a card terminal has been developed.

The IC card used in the conventional IC card system has no power source, and it cannot be operated by itself. For this reason, data of all the applications which can be specified by an IC card is provided at a terminal. However, in practice, data of all the applications for the IC card cannot be stored in the terminal because of the very high volume of data necessary. In the conventional system, compatibility between the IC card and the terminal is limited, and results in lower efficiency and inconvenience to the card holder.

Meanwhile, an intelligent-type IC card has been proposed. The intelligent-type IC card incorporates a power source, can designate an application by itself, and sends the specification data to the terminal.

As described in U.S. patent application Ser. No. 884,280 (the same assignee as that of this invention, with a filing date of July 10, 1986), now U.S. Pat. No. 4,727,244, however, in the system, when such a IC card is inserted in the terminal, power is supplied from the terminal to the card. At the same time, a reset signal (standardized by ISO) for energizing the card resets all the information in the card. Therefore, if the IC card is operated to designate the application and, thereafter, is inserted in the terminal, all the data inside the card may be cleared by the reset signal.

SUMMARY OF THE INVENTION

The present invention has been made in consideration of the above situation and has as its object to provide an IC card system wherein an IC card itself has a function for designating applications, thereby reducing the volume of data required in the terminal and improving compatibility.

It is another object of the present invention to provide an IC card system which can prevent internal data, e.g., an application, designated by an IC card itself, from being lost upon insertion of the card in the terminal.

According to the invention, there is provided an IC card system comprising:

IC card means including, memory means for storing at least transaction data and secret data for identification, power source means for supplying power to an internal circuit of the IC card means, and power source control means for controlling an ON/OFF state of the power source means, and terminal means, in which the IC card means is inserted, for performing data communication with the IC card means, the terminal means including at least detection means for detecting the ON/OFF state of the power source means of the IC card means when the IC card means is inserted in the terminal means.

BRIEF DESCRIPTION OF THE DRAWINGS

These objects and features of the present invention can be understood through the following embodiment by reference to the accompanying drawings, in which:

FIG. 5 is a block diagram showing the arrangement of the terminal shown in FIG. 4;

FIG. 6 is a flow chart for explaining the operation of the embodiment; and

FIGS. 7 and 8 are formats for explaining answer-to-reset data used in the embodiment of the present invention.

DETAILED DESCRIPTION OF THE PREFERRED EMBODIMENT

Figure 1:
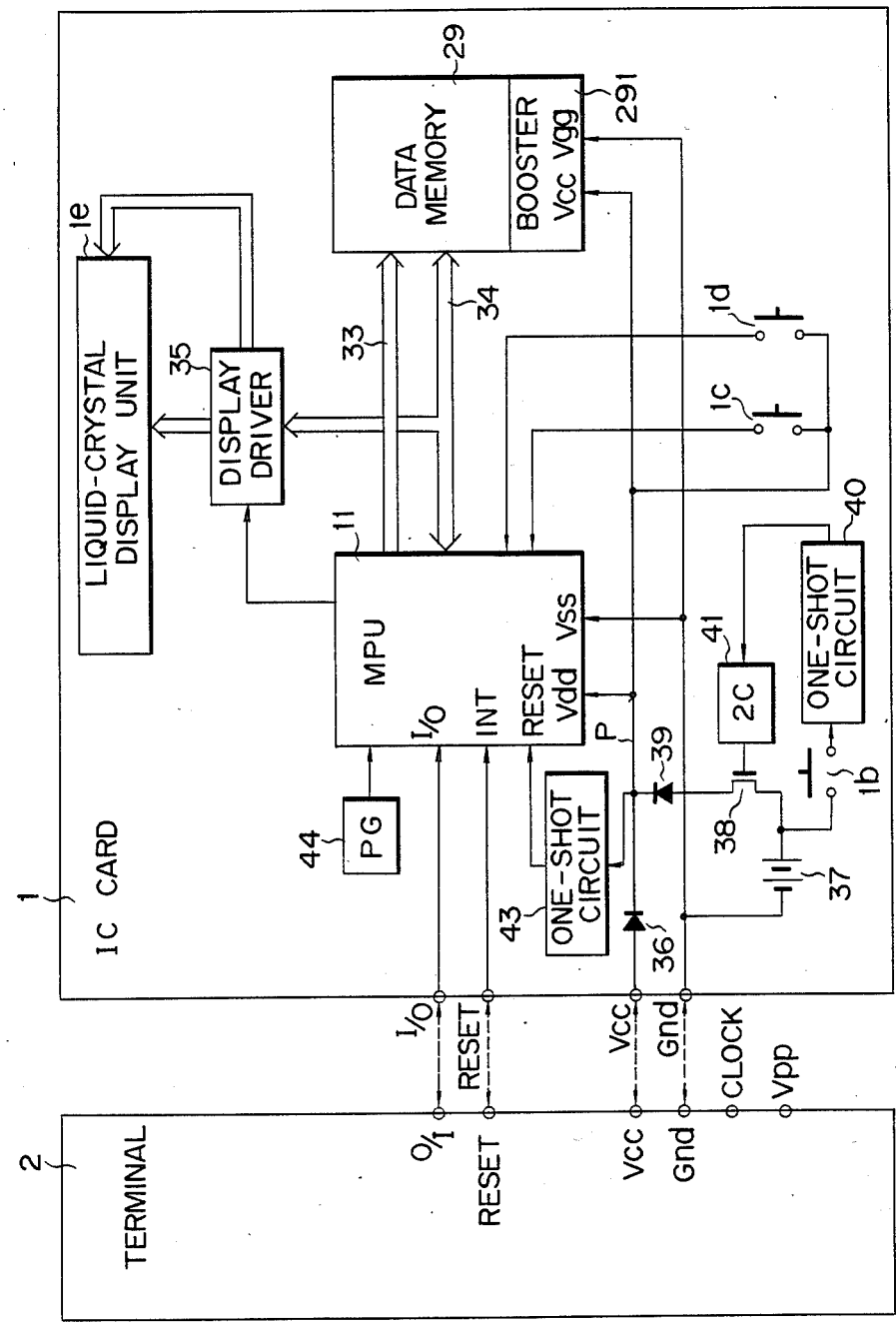
FIG. 1 is a block diagram showing the entire system according to an embodiment of the present invention.

FIG. 1 shows the arrangement of the entire IC card system. Referring to FIG. 1, reference numeral 1 denotes an IC card; and 2, a terminal in which IC card 1 is inserted.

Figure 2A:
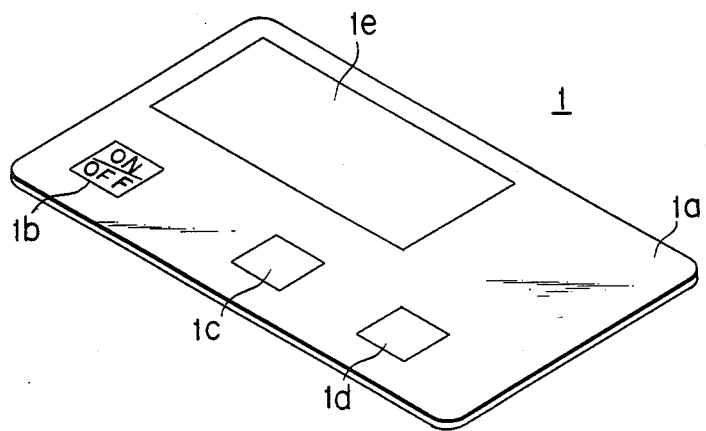
FIGS. 2A and 2B are perspective views showing the outer appearance of an IC card used in the embodiment.
Figure 2B:
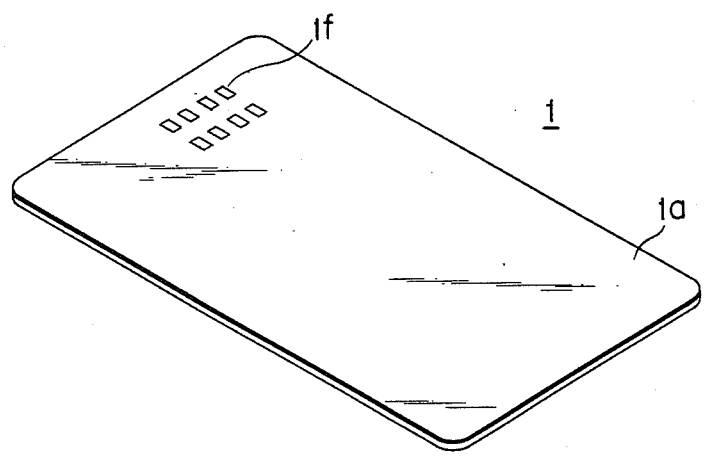

More specifically, IC card 1 has the following arrangement. FIGS. 2A and 2B show the outer appearance of IC card 1.

Referring to FIGS. 2A and 2B, reference numeral 1a denotes a card main body, which incorporates an IC circuit and a power source therefor. Main body 1a has a power ON/OFF key 1b, application designation key 1c, execution key 1d, and liquid-crystal display uni 1e on its surface side. Note that upon first depression of key 1b, the power source is turned on, and upon second depression thereof, the power source is turned off. Upon each depression of key 1c, applications, e.g., "home shopping", "home banking", "home reservation", and the like, can be selected, and are displayed on display unit 1e. Key 1d allows execution of the displayed application. Main body 1a has connector 1f for external connections on its back surface side. In this case, connector 1f consists of 8 (4×2) pins.

Referring back to FIG. 1, IC card 1 has MPU (microprocessor) 11. MPU 11 is represented by, e.g., a function block circuit shown in FIG. 3. In MPU 11, system bus 12 is connected to data ROM 13, application ROM 14, system program ROM 15, working RAM 16, system controller 17, decrypting unit 18, read/write controller 19, card status buffer 20, key controller 21, input controller 23 through input buffer 22, and output controller 25 through output buffer 24. Controllers 23 and 25 are connected to data input/output terminals I/O.

Data ROM 13 stores all the operating conditions for the IC card itself (e.g., data write, an application voltage, a current allowance and maximum application voltage, a maximum data transfer amount, a maximum response standby time, and so on). The condition data is transmitted to the terminal as answer-to-reset data in accordance with a predetermined format after internal initialization of the card itself is completed.

System program ROM 15 comprises code signal "ACK" or "NAC" indicating whether or not a signal supplied from terminal 2 together with various system programs is correct.

Working RAM 16 stores application data designated by the card itself.

System controller 17 outputs an operating instruction to respective circuits in accordance with operating conditions and a data reception signal supplied through input buffer 22.

Decrypting unit 18 decrypts data in accordance with the "RSA" algorithm. More specifically, unit 18 decrypts input data supplied from terminal 2 through input buffer 22 in accordance with a decrypting key code (issure's private key) stored in key code memory 26, and outputs the decrypted data to comparator 27. The comparison output from comparator 27 is supplied to system control line 17a of system controller 17. System control line 17a is connected to flag 28 which is operated in accordance with the comparison result of comparator 27.

Read/write controller 19 performs read/write control with respect to data memory 29 in response to an instruction from system controller 17. Memory data read out by controller 19 is output to comparator 27, system bus 12, or card status buffer 20.

Key input controller 21 detects key inputs from keys 1c and 1d on the surface of card 1 shown in FIG. 2A.

System controller 17 is connected to timer 30. Timer 30 counts a predetermined period of time when a data write voltage supply start instruction is supplied to terminal 2 in normal data exchange processing. During the counting operation of timer 30, if no affirmative response signal "ACK" is supplied from terminal 2, system controller 17 inhibits data exchange of this card.

A bus line connecting read/write controller 19 and system bus 12 is connected to address comparator 31. Comparator 31 compares an unused specific number set in fixed address unit 32 with a specific address specified through system bus 12 upon completion of a test after the manufacture of the card. The comparison output of comparator 31 is supplied to controller 19. Only when the comparison output is an address coincidence signal due to illegal use of terminal 2, all the data in data memory 29 is cleared, thus protecting secret data from being read out from the card.

Data memory 29 is connected to MPU 11 with the above arrangement through data line 34. In this case, data memory 29 comprises an EEP-ROM (Electrically Erasable Programmable Read-Only Memory), and stores codes "CA", "IPIN", "PAN", "CHN", "EPD", "PRK", and "RTN", status data "ST", and application codes corresponding to applications in its memory area. Note that "CA" (Card Authenticator) is a random code, and is used for encrypting and decrypting a message. "IPIN" (Initialization Personal Identification Number) is a random 6-bit code, and is used until personal identification number PIN is used. "PAN" (Primary Account Number) is an account number. "CHN" (Card Holder's Name) indicates a card holder's name. "EPD" (Expiration Date) indicates an expiration date. "PRK" (Private Key Code) is a decrypting code. "RTN" indicates the number of times of reinputs when data is erroneously input. "ST" indicates a current card status, and is transmitted to terminal 2 in a data format. Application codes include codes corresponding to, e.g., "home shopping", "home banking", "home reservation", and the like. Data memory 29 incorporates booster 291. Booster 291 is used when data is written in data memory 29.

Data line 34 is connected to display driver 35, as shown in FIG. 1. Display driver 35 receives a control signal from MPU 11. Display driver 35 is connected to liquid-crystal display unit 1e, as shown in FIG. 2A. Display unit 1e receives an LCD common signal and a display data signal from driver 35.

Card 1 has terminals I/O, Reset, Vcc, and Gnd as connector 1f, as shown in FIG. 1. Terminal I/O is connected to terminal I/O of MPU 11, and terminal Reset is connected to terminal INT, i.e., an interrupt terminal, of MPU 11. Terminal Vcc is connected to power source line P through diode 66, and terminal Vdd of MPU 11 and terminal Vee of booster 291 of memory 29 are respectively connected to line P. Terminal Gnd is connected to terminal Vss of MPU 11 and to terminal Vgg of booster 291 of memory 29.

Figure 3:
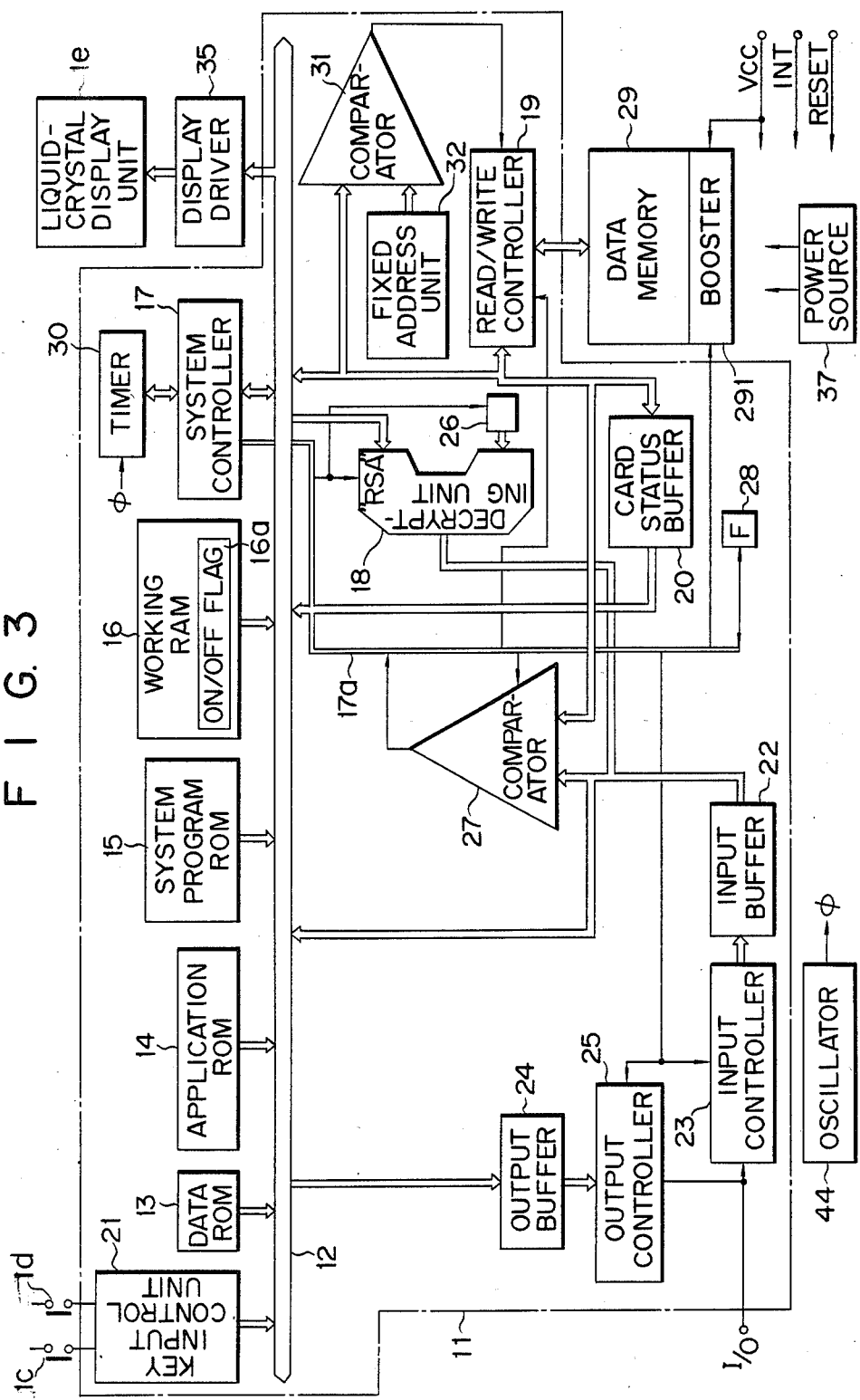
FIG. 3 is a block diagram showing the arrangement of an MPU used in the IC card shown in FIGS. 2A and 2B.

A series circuit of dry cell 37 for the card, switching element 38, and diode 39 connected in the direction shown in FIG. 3 is connected between line P and terminal Gnd. Power source (Dry cell) 37 comprises, e.g., a sheet cell so-called a paper battery. Switching element 38 comprises a p-channel MOS transistor, so that inputs 1 and 0 are alternately input thereto through one-shot circuit 40 and binary counter 41 upon depression of key 1b. Switching element 38 is turned on when the content of counter 41 is "0".

An input supplied to terminal Vcc or an output thereto through switching element 38 upon depression of key 1b is supplied to terminal Reset of MPU 11 through one-shot circuit 43, thus initializing MPU 11.

Power source line P is connected to keys 1c and 1d shown in FIG. 2A. These keys 1c and 1d are connected to key input controller 21 of MPU 11. Note that reference numeral 44 denotes an oscillator, which outputs a clock signal necessary for operating MPU 11.

Figure 4:
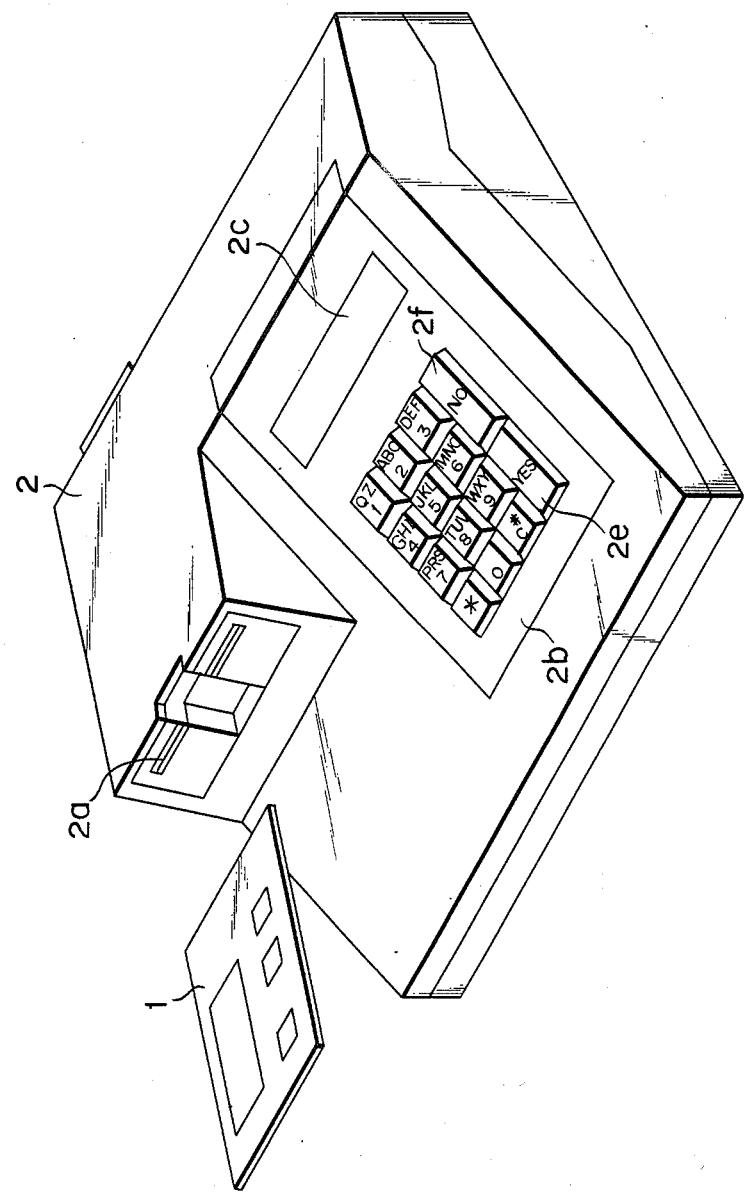
FIG. 4 is a perspective view showing the outer appearance of a terminal used in the embodiment.

FIG. 4 shows the outer appearance of card terminal 2 in which IC card 1 with the above arrangement is inserted. Terminal 2 has card insertion port 2a, keyboard 2b, and display unit 2c. Keyboard 2b includes numerical keys 2d, YES key 2e, NO key 2f, and the like. More specifically, terminal 2 has the arrangement shown in FIG. 5. Referring to FIG. 5, system bus 51 is connected to sound controller 52, working RAM 53, system program ROM 54, terminal attribute ROM 55, initial parameter RAM 56, main controller 57, display drive controller 58, key controller 59, reader/writer controller 60, comparator 61, decrypting unit 62 for decrypting data in accordance with the RSA algorithm, latch circuit 63 for latching code CA, DES encrypting unit 64 based on Data Encryption Standard, similar DES decrypting unit 65, I/O controller 66, output buffer 68 through output controller 67, and input controller 70 through input buffer 69.

Sound controller 52 is connected to loudspeaker 71, and generates an alarm sound as needed.

Working RAM 53 stores codes "PAN", "CHN", "EPD" and the like sent from card 1, and various processing data in terminal 2.

Terminal attribute ROM 55 stores terminal code TC (e.g., a manufacture code, an issue code, a store code, and so on) corresponding to its application.

Initial parameter RAM 56 stores answer-to-reset data from card 1. RAM 56 is connected to output controller 67, input controller 70, Vpp level latch 72, Vpp timer latch 73, and Ipp level latch 74 through transmission line 56a. These latches 72, 73, and 74 are connected to Vpp power source 75, Vpp timer 76, and Ipp limiter 77. A maximum data write voltage set by Vpp power source 75, a write voltage supply time set by Vpp timer 76, and a maximum data allowable write current set by Ipp limiter 77 are determined in accordance with answer-to-reset data stored in initial parameter RAM 56.

Data transmission line 56a connected to operating frequency selector 78 for card 1. Selector 78 receives an oscillation signal from oscillator 79 through frequency divider 80, and outputs from terminal Clock a signal with which an operating frequency is set.

Initial parameter RAM 56 is connected to timer 81. Timer 81 counts a maximum standby time from when an ENQ signal or other instruction signal is transmitted to IC card 1 in accordance with answer-to-reset data stored in RAM 56. During the standby time, if no response signal is sent back from card 1, main controller 57 instructs transmission of these signals or causes reader/writer mechanism 82 to disconnect from card 1 through controller 60.

System control line 57a of main controller 57 is connected to comparator 61, encrypting unit 62, latch circuit 63, and I/O controller 66, and controller 57 supplies control instructions to respective circuits in accordance with the operating condition of the system.

Display drive controller 58 performs display control with respect to display unit 2c of terminal 2 and back light 2cl, e.g., an EL element, arranged on the back surface of terminal 2. Back light 2cl is illuminated by reader/writer mechanism 82 only when IC card 1 is inserted in card insertion port 2a of terminal 2.

Key controller 59 supplies a key sampling signal to keyboard 2b of terminal 2 to detect a key input signal.

Reader/writer controller 60 controls reader/writer mechanism 82. Note that mechanism 82 comprises a motor for conveying card 1, so that it can convey card 1 inserted from port 2a of terminal 2 to a predetermined position, electrically connects it to terminal 2, and returns it to port 2a after predetermined processing.

Reader/writer mechanism 82 is connected to output buffer 69, reset controller 83, Ipp level latch 74, operating frequency selector 78, and Vcc power source 84. In this case, these components are respectively connected to terminals I/O, Reset, Vpp, Clock, and Vcc.

Input controller 70 and output controller 67 control data communication between IC card 1 and terminal 2 in accordance with instruction from main controller 57 through RAM 56. Controller 70 outputs data sent from card 1 to RAM 53 through input buffer 69, and also supplies it to comparator 61. The comparison output from comparator 61 is supplied to controller 57. Controller 67 supplies data sent from ROM 55 and encrypted data from unit 62 to card 1 through output buffer 68. Unit 62 encrypts code "PAN" sent from RAM 53 through bus 51 in accordance with a public key code supplied from IPK (Issure's Public Key) ROM 85. IPK ROM 85 prestores the public key code corresponding to code "PRK" stored in data memory 29 of card 1, and outputs the code in response to an instruction from controller 57.

Latch circuit 63 inputs latched code "CA" to units 64 and 65. Unit 64 receives predetermined data through bus 51, encrypts code "PAN" stored in RAM 53 in accordance with code "CA" as a key code in response to the instruction from controller 57, and outputs the encrypted code to controller 66. Unit 65 decrypts encrypted data input to controller 66 in accordance with code "CA", and outputs it onto bus 51.

I/O controller 66 performs encrypted data communication when a database, i.e., a host computer, is connected thereto in an on-line manner.

The operation of this embodiment with the above arrangement will be described with reference to the flow chart shown in FIG. 6.

A case will be described wherein the power source of card 1 is turned on and an application is designated by the card itself. In this case, in step A1 in FIG. 6, the power source of IC card 1 is turned on, and key 1b shown in FIG. 2A is depressed. When key 1b is turned on, an output is generated from one-shot circuit 40 shown in FIG. 3, and is supplied to binary counter 41. Each time counter 41 receives an input, it updates its content like "1"→"0"→"1". Assuming that the content of counter 41 is "1" it is updated to "0" in response to the output from one-shot circuit 40. In response thereto, switching element 38 is turned on, and dry cell 37 is connected between power source line P and terminal Gnd, thus applying a voltage to MPU 11 and booster 291 of memory 29. In this state, the flow advances to step A2. I step A2, a power source voltage is applied to one-shot circuit 43 from dry cell 37, and an output is generated therefrom and is applied to terminal Reset of MPU 11. Thus, MPU 11 is initialized. At the same time, a clock signal from oscillator 44 is supplied to MPU 11.

The flow then advances to steps A3 and A4. In steps A3 and A4, an application is designated using key 1c shown in FIG. 2A. More specifically, upon depression of key 1c, an input signal is supplied to MPU 11 from power source line P. In FIG. 3, a key input is supplied to system controller 17 through controller 21, and first application data is read out from memory 29. The data is displayed on display unit 1e through driver 35.

In this case, if the displayed content of unit 1e is not the desired one the operator again depresses key 1c. The key input is again supplied to controller 17 in the same manner as described above, and the next application data is read out from memory 29 to be displayed on display unit 1e. Thereafter, steps A3 and A4 are repeated.

In this state, if the displayed content of unit 1e corresponds to a desired application, the operator depresses execution key 1d. The flow then advances to steps A5 and A6. The key input from key 1d is supplied to controller 17 through controller 21 in FIG. 3. At this time, application data displayed on unit 1e is stored in worknng RAM 16. In this case, the application data is stored as home shopping "00000001", home banking "00000010", home reservation "00000011", and the like. Thus, application designation by card 1 itself is completed.

The flow then advances to step A7. In step A7, card 1 after application designation is inserted in terminal 2 while the power source of card 1 is kept ON. In this case, card 1 is inserted in port 2a in FIG. 4. Upon insertion of card 1, terminals I/O, Reset, Vcc, and Gnd of card 1 are connected to terminals I/O, Reset, Vcc, and Gnd of terminal 2. In this case, terminal Clock of terminal 2 can be connected in place of oscillator 44.

In this manner, when card 1 is connected to terminal 2, a preset initialization setting signal is supplied from terminal 2 to card 1. The initialization setting signal sets terminal I/O at H level, terminal Reset from L to H level, and terminal Vcc at a predetermined voltage, e.g., 5V under the control of controller 57. Terminal Clock is also set at a predetermined frequency, e.g., 4.9152 MHz.

The initialization setting signal is received by IC card 1 through terminals I/O, Reset, and Vcc. When terminal Clock of terminal 2 is connected in place of oscillator 44 as described above, the output from terminal Clock is also received by card 1. Card 1 is reenergized under the operating conditions based on the initialization setting signal. More specifically, the flow advances to step A8, and a signal input at terminal Reset of card 1 is supplied to terminal INT of MPU 11. The flow advances to step A9, and interrupt processing is executed. In the interrupt processing in step A9, MPU 11 is cleared except for the application code designated by card 1 itself and written in RAM 16. In this state, a power source signal is supplied from terminal Vcc to MPU 11 and booster 291 of memory 29. Next, in step A10, answer-to-reset data prestored in ROM 13 is read out therefrom under the control of controller 17, and is sent to terminal 2 from terminal I/O through bus 12, buffer 24, and controller 25.

In this case, the answer-to-reset data stored in ROM 13 has a format shown in FIG. 7. Referring to FIG. 7, respective operating condition data of card 1 are indicated by interface bytes TA1, TB1, TC1, and TA2, TB2, TC2, ..., and the presence/absence of the condition data is indicated by format byte T0. Reference symbol TD1 denotes a byte indicating the presence/absence of condition data TA2 and thereafter. Initial byte TS is initial setting data when these condition data are sent. Historical bytes T1, T2, ..., TK are used when the number of condition data in card 1 is increased. Initial byte TS, format byte T0, and interface bytes have an 8-bit data format. The code content of format byte T0 shown in FIG. 7 is as shown in FIG. 8. Reference symbols, a, b, c, and d denote bits indicating the number of bytes of historical bytes T1, T2, ..., TK; e, a bit indicating the presence/absence of condition setting data in interface byte TA1; f, a bit indicating the presence/absence of data in interface byte TB1; g, a bit indicating the presence/absence of data in interface byte TC1; and h, a bit indicating the presence/absence of data in interface byte TD1. In other words, these bits indicate whether or not any condition setting data is present in interface byte TA2 and thereafter. In this case, in order to send ON/OFF data of the power source of card 1, lower four bits a, b, c, and d of byte T0 are set except for "0,0,0,0" to indicate that the condition setting data is present in historical bytes T1, T2, ..., TK. In this state, data corresponding to the ON/OFF state of the power source of card 1 is set in byte T1 of bytes T1, T2, ..., TK. In this case, in the power source ON state, 1(00000001) is set, and in the power source OFF state, 0(00000000) is set. These data are stored in ON/OFF flag area 16a of RAM 16 in card 1, and are sent to terminal 2 as part of the answer-to-reset data.

The answer-to-reset data with the above format is received by terminal 2 in step B3 in FIG. 6. In this case, data input to terminal I/O of terminal 2 is supplied to input buffer 69 through controller 70. In step B4, a format character of byte T0 from controller 57 is compared with byte T0 in the answer-to-reset data held in input buffer 22 by comparator 61 to check if the lower four bits are all "0". If data other than "0" is set, the data in input buffer 69 is sent to RAM 53, and comparator 62 checks in step B5 if data "0" is set in historical byte T1. In this case, since the power source of card 1 is turned on as described above, the content of byte T1 is "1".

Therefore, the data in buffer 69 is written in RAM 56, and the flow advances to step B6. Thereafter, the application code in RAM 16 is sent to terminal 2, and processing corresponding thereto is executed in terminal 2. More specifically, when the answer-to-reset data is sent to terminal 2 from card 1 and it is determined that this data is correct, code ENQ is derived from ROM 54 under the control of controller 57, and is supplied to card 1 to be written in RAM 16. In this state, it is checked if controller 17 can normally receive code ENQ. If YES is obtained, code ACK is read out from ROM 15, and if NO is obtained, code NAC is read out therefrom. The readout code is supplied to terminal 2 through output buffer 24 and controller 25. The checking result is written in RAM 53 through controller 70 and buffer 62. If it is certified that card 1 is normally operated, code TC is read out from ROM 55, and is latched in buffer 68 through controller 67. If card 1 is not normally operated, a control instruction is supplied from controller 57 to reader/writer controller 60, and cancels connection with card 1 in mechanism 82. Code TC latched by buffer 68 is sent to card 1. In card 1, the application data stored in RAM 16 is read out, is temporarily latched in buffer 24, and is then sent back to terminal 2. In terminal 2, the application code is input to RAM 53 through controller 68 and buffer 62, and is stored therein. After the application or type of the application code is judged by controller 57, an instruction code is read out from ROM 54 in accordance with the judging result, and is sent back to card 1. When the instruction code is read out, an identification number input from keyboard 2b of terminal 2 and self-identification number PIN prestored in card 1 are compared. When a coincidence is found therebetween, a data exchange operation, e.g., money transaction, is executed.

A case will be described wherein card 1 is inserted in terminal 2 while the power source of card 2 is kept OFF. In this case, when card 1 is inserted in terminal 2, a preset initialization setting signal is supplied to IC card 1. The initialization setting signal sets terminal I/O at H level, terminal Reset at H level, and terminal Vcc at a predetermined voltage, e.g., 5V under the control of controller 57, thus setting the state of step B1 in FIG. 6. In step B1, a voltage at terminal Vcc is applied to card 1. Then, one-shot circuit 43 is energized, and an output therefrom is supplied to terminal Reset of MPU 11, thereby initializing MPU 11. At the same time, a clock signal from oscillator 44 is supplied to MPU 11. In this state, the flow advances to step B2, and the answer-to-reset data prestored in ROM 13 is read out under the control of controller 17, and is sent to terminal 2 through bus 12, buffer 24, and controller 25.

The answer-to-reset data is received by terminal 2 in step B3. In this case, data input at terminal I/O of terminal 2 is supplied to buffer 69 through controller 70. In step B4, a format character of byte T0 from controller 57 and byte T0 in the answer-to-reset data in buffer 22 are compared by comparator 61 under the control of controller 57 to check if lower four bits are all "0". If data other than "0" is set, the data in buffer 69 is sent to RAM 53, and comparator 61 checks in step B5 if data "0" is set in historical byte T1. In this case, since the power source of card 1 is turned off as described above, the content of byte T1 is "0". The flow then advances to step B7. In step B7, if the power source of card 1 is kept OFF and no application designation is made, since terminal 2 cannot judge the type of card 1 or data stored therein, a message "select application" is displayed on display unit 2c through controller 58 under the control of controller 57. At the same time, card 1 is exhausted from port 2a of terminal 2 shown in FIG. 4.

When card 1 is inserted in terminal 2 while the power source of card 1 is turned on but no application is designated, terminal 2 determines that the application displayed on display unit 1c of card 1 is designated, and the corresponding processing is executed.

The present invention is not limited to the above embodiment, and various changes and modifications may be made within the spirit and scope of the invention.

According to the present invention, an intelligent type IC card which has its own power source, stores data designated by an input unit using the power source, and allows the storage content to be displayed on a display unit, is employed. When such a card is inserted in a terminal, the presence/absence of data designation is judged in accordance with the ON/OFF state of the power source of the card and, thereafter, a predetermined operation corresponding to the designation data can be executed. Therefore, the volume of data in the terminal ca be reduced, and compatibility can be improved.

According to the present invention, when an intelligent-type IC card, which is capable of designating application data by itself, is inserted in a terminal, a reset signal supplied from the terminal to the card is supplied as interrupt data, and the IC card can be reenergized in response thereto. Therefore, internal data, e.g., application data designated by the IC card can be protected from being lost by the reset signal.

What is claimed is:

1. An IC card system comprising:
   IC card means including,
   memory means for storing at least transaction data and secret data for identification,
   power source means for supplying power to an internal ciruuit of said IC card means, and
   power source control means for controlling an ON/OFF state of said power source means; and
   terminal means, in which said IC card means is inserted, for performing data communication with said IC card means, said terminal means including at least detection means for detecting the ON/OFF state of said power source means of said IC card means when said IC card means is inserted in said terminal means.

2. A system according to claim 1, wherein said memory means further includes an area for storing data indicating the ON/OFF state of said power source means, and
   said detection means of said terminal means determines the ON/OFF state of said power source means in accordance with whether or not predetermined data is stored in said area.

3. A system according to claim 1, wherein said IC card means further includes display means, thereby displaying the detection result of said detection means.

4. A system according to claim 3, wherein said IC card means further includes keyboard means for selecting one of a plurality of applications prestored in said IC card system, and
   said display means displays a name of an application selected by said keyboard means.

5. A system according to claim 1, wherein said terminal means further includes means for outputting a reset signal and resetting said IC card means, and
   said IC card means further includes means for preventing reset processing by said reset signal from said terminal means.

6. A system according to claim 5, wherein said IC card system includes means for switching a power supply for said IC card means from said power source means to a power supply output from said terminal means when said IC card means is inserted in said terminal means.

* * * * *

UNITED STATES PATENT AND TRADEMARK OFFICE
CERTIFICATE OF CORRECTION

PATENT NO. : 4,794,236

DATED : December 27, 1988

INVENTOR(S) : S. Kawana et al

It is certified that error appears in the above-identified patent and that said Letters Patent is hereby corrected as shown below:

In the title page of the patent, under the heading, "Foreign Application Priority Data", delete "Oct. 29, 1985 [JP] Japan....60-242238".

Signed and Sealed this

Second Day of January, 1990

Attest:

JEFFREY M. SAMUELS

Attesting Officer     Acting Commissioner of Patents and Trademarks